Aug. 16, 1966  G. B. DEAN  3,266,672
BEVERAGE DISPENSER WITH CARBONATOR
Filed March 6, 1964  3 Sheets-Sheet 1
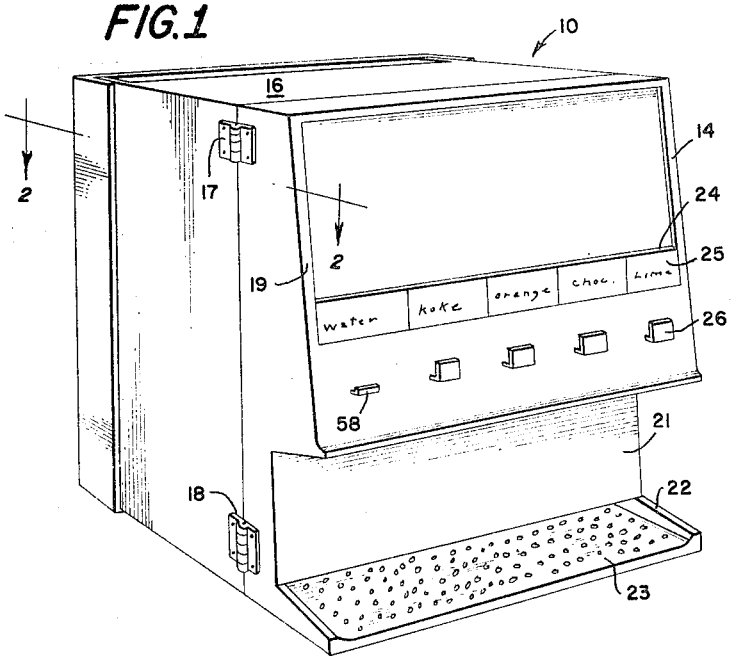
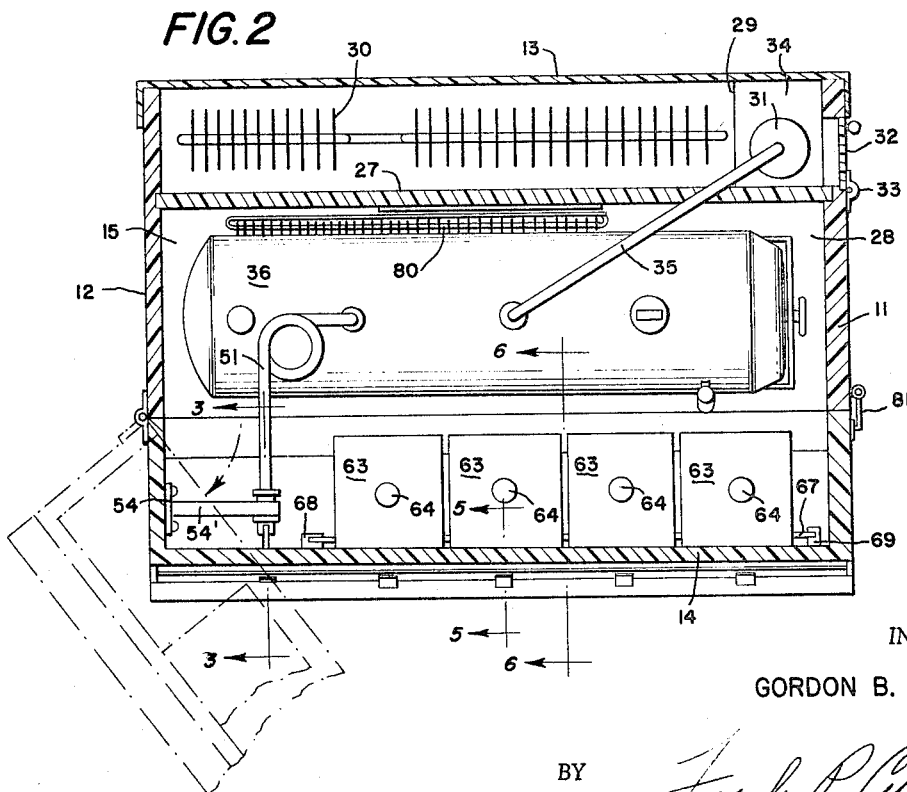
INVENTOR
GORDON B. DEAN
BY
ATTORNEY Aug. 16, 1966  G. B. DEAN  3,266,672
BEVERAGE DISPENSER WITH CARBONATOR
Filed March 6, 1964  3 Sheets-Sheet 2

INVENTOR
GORDON B. DEAN
BY Frank P. Cyr
ATTORNEY

Aug. 16, 1966  G. B. DEAN  3,266,672
BEVERAGE DISPENSER WITH CARBONATOR
Filed March 6, 1964  3 Sheets-Sheet 3

INVENTOR
GORDON B. DEAN

BY *Frank P. Cyr*
ATTORNEY

United States Patent Office 3,266,672
Patented August 16, 1966

3,266,672
BEVERAGE DISPENSER WITH CARBONATOR
Gordon B. Dean, 1814 Addington Ave., Louisville, Ky.
Filed Mar. 6, 1964, Ser. No. 349,986
3 Claims. (Cl. 222—129.1)

The present invention relates to a self-contained syrup and soda water dispenser preferably adapted for home use although not limited thereto.

Most of the soft drinks as they are available on the market today are either bottled or packaged in containers and in order to present a palatable drink, the containers must be stored for some time prior to use in a refrigerated container so as to cool the contents thereof. With the present invention the ingredients for making a soft drink are contained within a refrigerated cabinet and when it is desired to produce a drink of a given flavor a suitable valve mechanism is actuated to release the desired amount of syrup and following the introduction of the syrup into a container then a second valve mechanism is employed for dispensing carbonated water which is also maintained under refrigeration within the aforesaid cabinet.

Actually, the beverage dispenser of the instant invention is adapted for use in connection with any type of beverage that is improved by aeration, whether it be of the type that is served hot or cold. Among the numerous beverages that are improved by the aerating effect of the apparatus of the present invention are orange beverages, grape beverages, chocolate flavored beverages, etc. Among the heated beverages that are improved by the aerating process of the instant invention are hot chocolate and/or hot cocoa, etc.

It is an object of the present invention to provide a hot or cold beverage dispenser which houses all of the components within an insulated cabinet. It is also an object of the invention to provide the cabinet with access doors so that the interior thereof can be made accessible to the user of the dispenser for the replacement of the parts housed therein.

It is a further object of the invention to provide a beverage dispenser with an access door at the front thereof with syrup or other liquid containers mounted on the back thereof thereby making it possible to replace the aforesaid containers when the cabinet door is swung to an open position.

Another object of the invention is to provide a beverage dispenser with a $CO_2$ container which will feed under pressure a gas which is caused to be diffused into a water container which is housed within the cabinet.

Another object of the invention is to provide a water container employed in a beverage dispenser with a novel means for aerating the water maintained therein.

Another object of the invention is to provide a carbonated beverage dispenser cabinet with a plurality of valves which are in communication with a plurality of syrup containers so as to permit the dispensing from the containers of the syrups contained therein.

Another object of the invention is to provide a simplified structure for a carbonated beverage dispenser which will be compact in size and one which may be easily transported from one place to another and can be placed in operation either in a home, picnic area, etc., the only provision being that there be a source of electric power obtainable for operating the refrigerating and/or heating equipment employed with the cabinet.

The above and other highly important objects and advantages of the invention will be made apparent or further emphasized in the following specification, claims and appended drawings.

In the accompanying drawings, like characters indicate like parts throughout the several views.

Referring to the drawings:

FIG. 1 is a front and side perspective view of a beverage dispenser incorporating a preferred embodiment of the invention.

FIG. 2 is a view taken on line 2—2 of FIG. 1 looking in the direction of the arrows with the front door of the cabinet shown in open position as indicated by the dot and dash line section.

Figure 3:
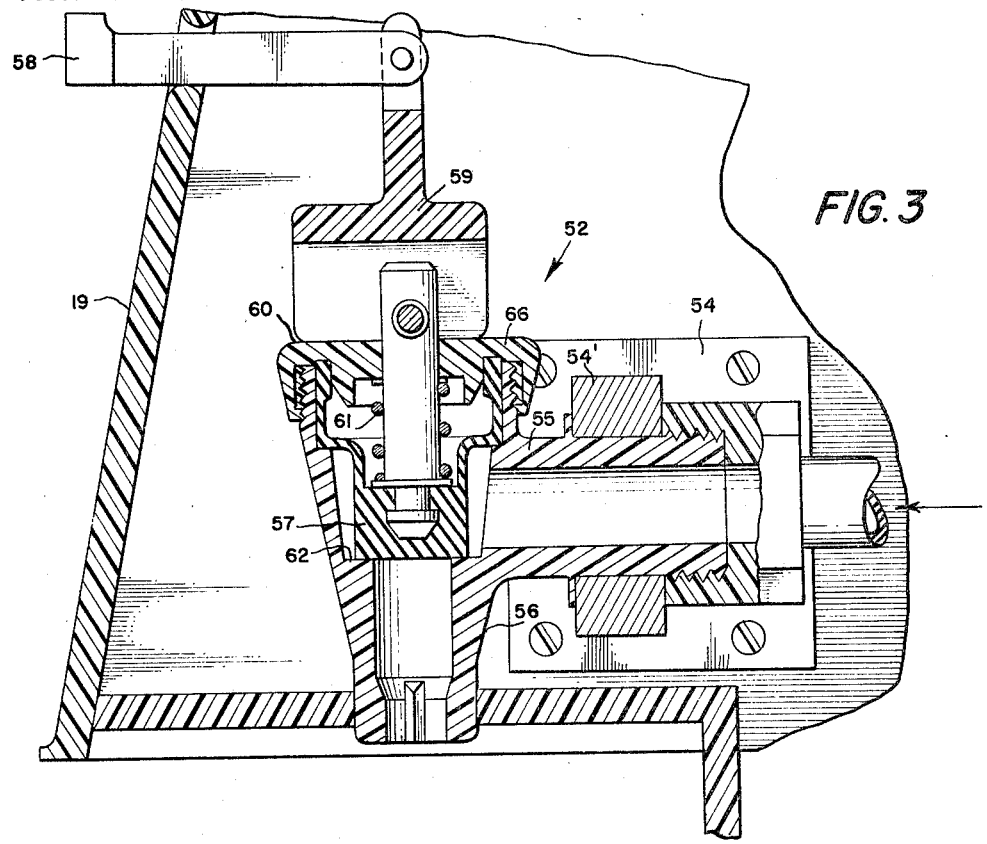
FIG. 3 is an enlarged fragmentary view taken on line 3—3 of the FIG. 2, looking in the direction of the arrows.

Referring now to the drawings, there is shown generally by reference character 10 a cabinet or housing which is employed for housing the components employed with the present invention for dispensing a carbonated beverage. The housing 10 comprises a generally rectangular shaped structure with side walls 11 and 12, a rear wall 13 and a front closure 14. The cabinet 10 is provided with a bottom wall 15 and a top wall 16. It should be pointed out at this time that side walls 11, 12, the front closure 14 and top and bottom walls 16 and 15 respectively are formed of any material and, if desired, can be molded to shape. For instance, the side walls, rear wall, top and bottom walls and front closure can be molded of a foam plastic material which has excellent insulating properties. In the event that these parts are formed of other material then it is desirable that suitable insulating material be placed interiorly of the aforementioned parts in order to insure a well insulated cabinet for housing the components for dispensing a beverage.

Figure 5:
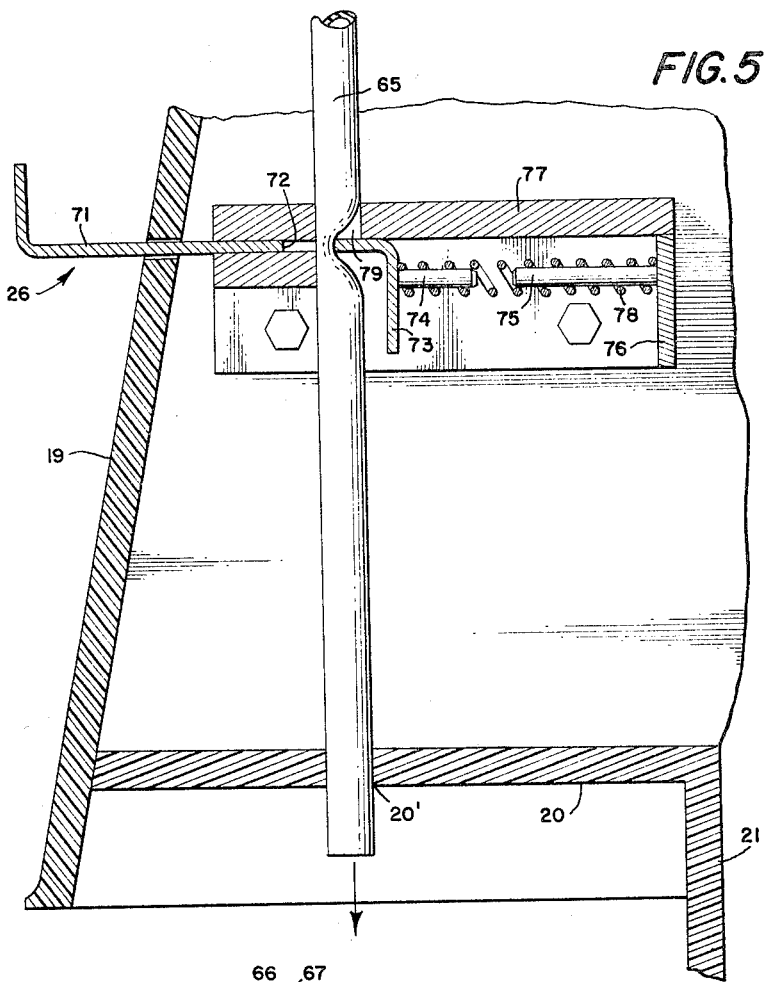
FIG. 5 is an enlarged fragmentary view taken on line 5—5 of FIG. 2, looking in the direction of the arrows, and, FIG. 6 is an enlarged fragmentary section taken on line 6—6 of FIG. 2, looking in the direction of the arrows.

The front closure 14 for the cabinet is hingedly mounted to side wall 12 of the cabinet by means of hinges 17 and 18. The front closure 14 covers the entire front of the cabinet 10 and includes a downwardly flaring or slanting wall portion 19 which is closed at the lower end by means of a horizontally extending wall portion 20 which can be formed integral with a vertically extending wall portion 21 so as to seal off the front of the cabinet from the outside atmosphere. Opening 20' is formed in wall 20 for receiving therein outlet conduit 65 as shown in FIGURE 5 of the drawings. The vertical wall 21 terminates to a horizontal ledge 22 which is adapted to support a conventional grid 23 for catching any drippings from the dispensing outlets in the conventional manner.

The downwardly slanting or flaring wall portion 19 is provided with a plurality of recessed portions 24 which are adapted to receive indicia bearing cards 25 which will give a visual indication of the flavor of the syrup which is to be dispensed from the cabinet upon actuation of any one of a number of valves 26 which are positioned immediately therebelow. It may be pointed out that the front closure 14 can be made of the same material as the remainder of the cabinet although, if desired, the front closure can be made of a highly polished metal or other material which will add to the appearance of the cabinet in general. The grid member 23 which is on the horizontal ledge 22 is of conventional structure and, hereagain, the grid can be made of any material but preferably it will be constructed of a non-corrosive metal and one having a high luster so as to enhance the appearance of the cabinet while still performing its intended function.

Figure 4:
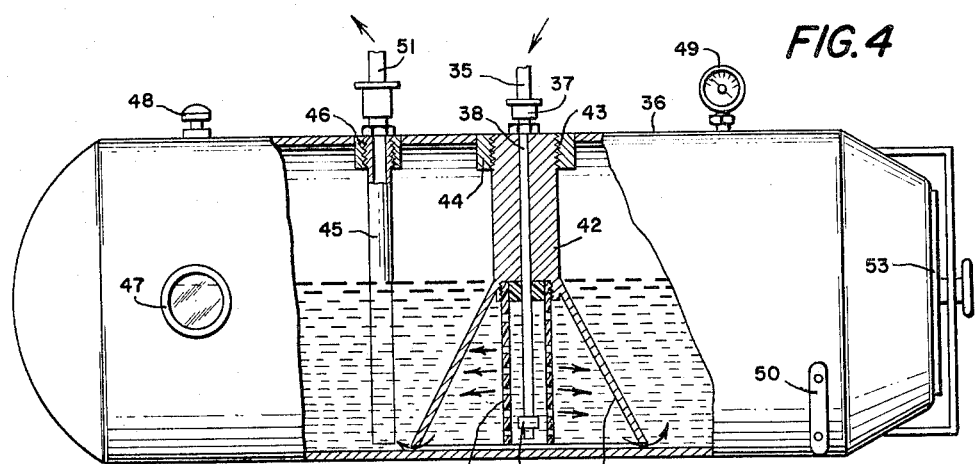
FIG. 4 is an enlarged view, partly in section of the carbonator employed in the present invention.

The interior of the cabinet 10 is provided with an intermediate wall 27 which extends between side walls 11 and 12 and is secured thereto in any manner and divides the interior of the cabinet into an insulated portion or housing 28 and a rear compartment 29 which houses a conventional refrigerating unit shown generally by reference character 30. The rear wall 13 of the cabinet 10 is opened at the top and bottom so as to permit the circulation of air around the refrigerating unit so as to dissipate any heat created thereby. As clearly shown in FIG. 2 of the drawings, rear wall 13 is friction-fitted about side walls 11 and 12 for forming a closure for the rear compartment 29. The rear wall 13 can be made of insulating material or of any other material suffice it to be that it be open at the top and bottom so as to permit the circulation of air, as aforesaid. The rear compartment 29 also houses a container 31 for a $CO_2$ gas. Since it becomes necessary that the $CO_2$ container 31 be replaced from time to time an access door 32 is provided in side wall 11 and is hinged thereto by means of hinge 33. The bottom wall 15 of the cabinet is provided with a shelf portion 34 which supports the $CO_2$ container as shown in FIG. 2 of the drawings. Leading from the $CO_2$ container 31 and detachably secured thereto is a conduit 35 which extends from the $CO_2$ container to a water storage tank 36. A suitable pressure regulating valve, not shown, is associated with the $CO_2$ container so as to deliver therefrom and into conduit 35 a gas under a regulated pressure. Conduit 35 is detachably secured to the water storage tank 36 by means of a threaded connection 37. A tube 38 leads from the threaded connection 37 downwardly into the water storage tank 36 and terminates at a point closely adjacent the bottom of the tank. A one-way valve 39 is provided at the outlet end of tube 38 and permits gas under pressure from conduit 35 to exit therethrough and into a hollow cylinder 40 which acts to diffuse the gas therefrom. The hollow cylinder 40 can be in the nature of a ceramic block or other porous substance which will permit the slow egress of gas therethrough in the form of minute particles which will be subsequently entrained in the liquid stored within the water storage tank 36. It will be noted that the hollow cylinder 40 which acts as a diffuser extends to a position closely adjacent the bottom wall of the water storage tank. This will insure the passage of gas from therewithin into the water which is in the storage tank. However, in order to make certain that no gas emanating from the hollow cylinder 40 escapes into the water storage tank without first coming in contact with the water stored therein, a baffle 41 is secured to a sleeve-like member 42 which is threadedly engaged as at 43 to a threaded member 44 which extends within the interior of the water storage tank 36, as clearly shown in FIG. 4 of the drawings. The baffle 41 is shown to be generally cone-shaped and extends from the sleeve 42 to a point closely adjacent the bottom wall of the tank. This will insure that any gas which emanates from the hollow cylinder 40 will have to travel under the baffle 41 in order to escape from thereunder and in so doing it will necessarily have to come in contact with any water which is contained within the water storage tank. While the drawings, particularly FIG. 4 show the baffle and tube 38 as extending vertically into the water storage tank, it is obvious that the tube 38 and a suitable baffle can be provided so that it will extend along the length of the container for diffusing a gas within the water stored therein for carbonating the same. Also, while I have disclosed water storage tank 36 as being disposed along the bottom wall of the cabinet it is obvious that the storage tank can be stored or placed in the cabinet in an upright or vertical position.

An outlet tube 45 extends from a position close to the bottom of the water storage tank 36 and threadedly engages a coupling 46 mounted interiorly of the water storage tank 36. The outlet tube 45 can be constructed of any material but preferably a flexible tubing is employed such as a rubber tubing or one made of the numerous plastic materials available for producing such tubings. The water storage tank 36 is provided with a water level sight gauge 47 which is formed in one wall of the storage tank. The water level gauge will give a visual indication to the user of the dispenser of the amount of liquid remaining in the storage tank. It is preferable to place the sight gauge about mid-way the height of the storage tank so that when an observer notices that the water level is below the sight gauge the water storage tank will have to be replenished with a supply of fresh water within a short time if additional beverages are to be dispensed from the unit. A safety valve 48 is provided in one wall of the container and is adapted to become operative for relieving pressure from within the water storage tank 36 when the pressure therein exceeds a given limit. A pressure gauge 49 is also provided in one wall of the storage tank to give a visual indication of the amount of pressure within the storage tank. For ease of handling of the water storage tank 36, a handle 50 is formed along one wall of the storage tank. A flexible conduit 51 connects to coupling 46 in any suitable manner and extends to a valve mechanism indicated generally by reference character 52. When it is desired to replenish the supply of water within the water storage tank 36, the front closure 14 is swung to an open position and after making the proper disconnection of conduits 35 and 51 from the water storage tank, the tank is manipulated by the handle 50 and can be bodily removed from within the cabinet and water added therein through a filler cap 53 which is formed along one wall of the storage tank. The filler cap 53 is of conventional construction and need not be described in detail herein. It should also be pointed out that the handle 50 which is formed in one side wall of the water storage tank 36 acts as a stabilizer when the tank is in place within the cabinet so as to prevent the rolling thereof within the cabinet which would be objectionable due to the several connections made to the storage tank by means of the aforesaid conduits.

Flexible conduit 51 leading from the water storage tank 36 is preferably composed of a flexible material and as clearly shown in FIG. 2 of the drawings, the conduit is coiled about itself several times so as to permit extension of the conduit which is connected to the valve 52 to follow the same when the front closure 14 is swung from a closed to an open position as indicated in the dot-dash lines of FIG. 2.

Valve 52 is mounted interiorly of the front closure 14 and is secured to one wall thereof by means of a bracket 54. The bracket is formed of any suitable material and has an arm 54¹ which extends therefrom and supports a tubular hollow shaft 55 which forms the inlet for the valve mechanism. Numeral 56 indicates the outlet for the valve and extends through an opening formed in the horizontally extending wall portion 20 as shown in FIG. 3 of the drawings. The valve structure employed with the present dispenser is of conventional design and includes a spring pressed seat 57 which is caused to be lifted off its seat upon inward movement of an actuating handle 58 which extends through an opening formed in the downwardly or flaring wall section 19. The operation of the valve is believed obvious. Upon actuation of the handle 58, by depressing the same inwardly toward the inside of the cabinet, the yolk 59 is caused to pivot on bearing surface 60 thereby permitting the spring 61 to be compressed and thereby permit the valve seat 57 to be lifted from the seat bearing surface 62. Of course, when the valve is opened, as aforesaid carbonated water from within the storage tank 36 is permitted to flow through the valve and outwardly therefrom into a suitable container which is positioned below the valve outlet. Upon release of pressure on actuating handle 58 the valve returns to its original seated position and thereby prevents the further flow of fluid therethrough. It will be understood, of course, that so long as the valve remains in an open position that liquid from within the water storage will be forced outwardly therefrom by reason of the pressures existing in the storage tank.

Mounted on the back side of the front closure 14 are a plurality of syrup containers indicated generally by reference characters 63. The syrup containers are formed of any material and can be of any desired size. Filler openings 64 are formed in the top wall of the containers and are provided with suitable cap mechanisms for closing the same. The filler openings may be utilized for replenishing the supply of syrup within the containers 63. There is provided on the bottom wall of each container 63 a means for connecting an outlet conduit 65, there being one such outlet for each syrup container. The outlet conduit 65 is preferably formed of a flexible tubing made of rubber, or other plastic material. It should be noted, however, that the outlet conduit be made of a compressible material in order that it may cooperate with a sliding type valve to effect the closure of the outlet conduit.

Figure 6:
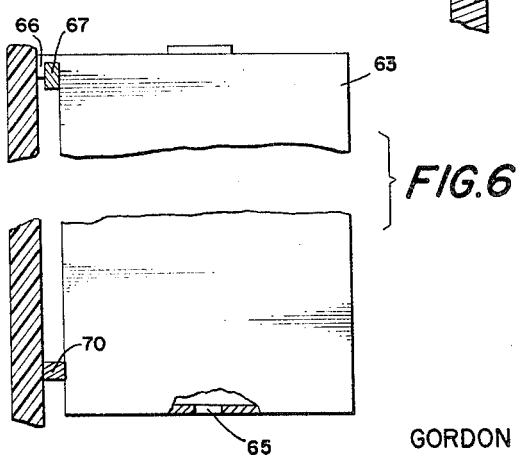

The syrup containers 63 are formed with a lip extending along the top of one wall of the container as shown by reference character 66 of FIG. 6. The lip 66 is adapted to extend over a horizontally disposed bar 67 which is secured to brackets 68 and 69 which are secured to the rear portion of the front closure 14. A spaced bar 70 in the nature of a rubber bumper or the like is secured to the rear wall of the front closure as shown in FIG. 6 so as to permit the syrup containers to abut thereagainst when the containers are in proper position on the aforementioned horizontally disposed bar 67.

Disposed underneath each of the syrup containers 63 are slidable valves 26. Since all valves 26 are constructed in a like manner it will be sufficient that one such valve be described herein. As shown in FIG. 5 of the drawings, the slidable valve 26 comprises a horizontally disposed bar 71 which is formed with an opening 72 therein. The horizontally disposed bar 71 terminates in a downwardly extending lip portion 73 to which is secured a stub shaft 74. A guide shaft 75 is fixedly secured to a stationary stop member 76 which extends downwardly from a horizontally disposed bracket 77. A spring 78 is positioned between the downwardly extending lip 73 and stationary stop member 76 and encircles stub shaft 74 and guide shaft 75 as clearly shown in FIG. 5 of the drawings. The outlet conduit 65 leading from the syrup container is adapted to extend through the opening 72 in the horizontally disposed bar 71. It will be seen, therefore, that spring 78 will tend to force the downwardly extending lip 73 outwards and in so doing will cause the wall of the opening 72 to engage the flexible outlet conduit and to compress the same into a non-dispensing position. It will be noted that the outlet conduit 65 extends through an opening 79 formed in the horizontally disposed bracket 77. The dispensing end of the outlet conduit 65 extends through an opening formed in the horizontally extending wall portion 20 where it can dispense a syrup from within one of the syrup containers into a suitable drinking cup or the like. It will be obvious that upon depressing the slidable valve 26 against the action of spring 75 that pressure on the flexible conduit 65 will be released and syrup will be allowed to dispense by gravity from one of the syrup containers and will continue to flow therefrom until such time as a desired amount of syrup has been collected in a drinking glass or like container. When a sufficient amount of syrup has been dispensed the pressure on the slidable valve is released and spring 75 returns the valve to its normal closed position and prevents the further dispensing of syrup from the conduit. Then, by actuating valve 52 a desired amount of carbonated water is dispensed from the water storage tank to make the desired carbonated drink.

The refrigeration unit 30 disclosed in the drawings is of the type which operates on an absorption cycle principle. This type of a refrigeration unit is preferable for use with an apparatus of this type since it is compact and simple and it can be easily used in a beverage dispenser constructed in accordance with the structure set forth herein. Briefly, an evaporator 80 is placed within the insulated portion of the cabinet as clearly shown in FIG. 2 of the drawing with the remainder of the components for the refrigerating unit being housed in the rear compartment 29 where the heat generated by this portion of the unit can be dissipated, as aforesaid. While I have disclosed an absorption type refrigerating unit in the drawings herein, it is obvious that any type refrigeration unit can be employed for accomplishing the same purpose. Also, if the cabinet is to be used for dispensing an aerated hot drink then in lieu of the evaporator 80 a heating element can be substituted in its place so that the interior of the cabinet can be heated for providing hot aerated water for producing a hot drink.

A latch 81 is provided for maintaining the front closure 14 in closed position except when it is desired to have access to the interior of the cabinet.

The machine illustrated has been thoroughly tested and found to process all of the advantages characteristics attributed thereto; and while I have shown and described the preferred embodiment of my novel device it will be understood that the same is capable of modification without departure from the spirit and scope of the invention as defined in the claims.

What I claim is:

1. A carbonated beverage dispenser comprising a cabinet, a refrigeration unit in association with said cabinet, a closure for said cabinet, a water storage container in said cabinet, a water aeration means in said cabinet, said water aeration means comprising an imperforate cone-shaped structure located within said water storage means and being positioned substantially at floor level thereof, a conduit means from said aeration means to said water storage container for delivering a gas from said aeration means to said water storage container for aerating the water therein, a conduit means leading from said water storage container to a point outside of said cabinet, flavoring material removably mounted on said closure, conduit means associated with said flavoring material containers for delivering a quantity of said flavoring material outside of said cabinet, and valves associated with each of said conduit means for regulating the flow of material therefrom.

2. A beverage dispensing unit comprising a cabinet, said cabinet housing a heat exchange unit, a water container, flavoring material containers, and a pressurized gas container, a conduit from said pressurized gas container to said water container, a conduit from said water container extending to a position outside of said cabinet, conduits from said flavoring material containers extending to a position outside of said cabinet, a gas diffuser in said water container in communication with said gas container, said gas diffuser comprising a generally cone shaped imperforate structure extending to a position closely adjacent the lower wall of said water container and outlet valves associated with each of said conduits for regulating the flow of material therefrom.

3. A carbonated beverage dispenser comprising a cabinet, a heat exchange unit associated with said cabinet, a closure for said cabinet, a removable water storage container in said cabinet, a pressurized gas container in said cabinet, a conduit from said gas container to said water container, an imperforate cone-shaped gas diffuser extending to a point closely adjacent the bottom wall of said water container and being in communication with said conduit for diffusing a gas in said water container, syrup containers removably mounted on said closure and extending within the confines of said cabinet, conduits leading from said water container and said syrup containers and extending to a position outwards of said cabinet and valves associated with each of said conduits for regulating the flow of material therefrom.

References Cited by the Examiner

UNITED STATES PATENTS

| | | | |
|---|---|---|---|
| 955,182 | 4/1910 | Michal | 261—76 |
| 972,883 | 10/1910 | Ludwig. | |
| 1,015,636 | 1/1912 | Riepp | 222—131 |
| 1,993,130 | 3/1935 | Ballew | 62—390 |
| 2,081,029 | 5/1937 | Young. | |
| 2,082,363 | 6/1937 | Stone | 261—123 |
| 2,103,479 | 12/1937 | Magee. | |
| 2,191,918 | 2/1940 | Stadtfeld | 222—131 |
| 2,255,280 | 9/1941 | Colvin | 222—131 X |
| 2,623,014 | 12/1952 | Kloth. | |
| 2,657,628 | 11/1953 | Von Stoeser | 222—129.4 X |
| 2,755,979 | 7/1956 | Lawson et al. | 222—129.4 X |
| 2,777,304 | 1/1957 | Nave. | |
| 2,956,418 | 10/1960 | McCann | 62—390 X |
| 3,133,671 | 5/1964 | Christine et al. | 222—146 X |
| 3,178,061 | 4/1965 | Giacalone et al. | 222—146 X |
| 3,180,529 | 4/1965 | Buffington | 222—131 |
| 3,195,779 | 7/1965 | Nicko | 222—129.1 X |

RAPHAEL M. LUPO, *Primary Examiner.*